United States Patent
Deguillaume et al.

(10) Patent No.: US 6,904,151 B2
(45) Date of Patent: Jun. 7, 2005

(54) METHOD FOR THE ESTIMATION AND RECOVERING OF GENERAL AFFINE TRANSFORM

(76) Inventors: Frédéric Deguillaume, 12, promenade Jean-Treina, Geneva (CH), CH-1203; Sviatoslav Voloshynovskiy, 10, rue Liotard, Geneva (CH), CH-1202; Thierry Pun, 60, chemin de la Gradelle, Chêne-Bougeries (CH), CH-1224

( * ) Notice: Subject to any disclaimer, the term of this patent is extended or adjusted under 35 U.S.C. 154(b) by 681 days.

(21) Appl. No.: 10/051,808

(22) Filed: Jan. 17, 2002

(65) Prior Publication Data

US 2003/0133589 A1 Jul. 17, 2003

(51) Int. Cl.[7] .................................. G06K 9/00
(52) U.S. Cl. ............... 380/100; 382/248; 382/250; 382/276; 348/380; 708/400; 708/402
(58) Field of Search ................. 382/100, 232, 382/240; 380/51, 54, 210, 252, 287; 713/176, 179; 370/522–529; 348/461, 463; 725/9, 20, 22; 704/200.1, 273; 283/72, 74–81, 85, 93, 113, 901, 902; 375/130; 386/94; 705/57, 58

(56) References Cited

U.S. PATENT DOCUMENTS

| | | | | |
|---|---|---|---|---|
| 6,385,329 B1 | * | 5/2002 | Sharma et al. | 382/100 |
| 6,408,082 B1 | * | 6/2002 | Rhoads et al. | 382/100 |
| 6,483,927 B2 | * | 11/2002 | Brunk et al. | 382/100 |
| 6,580,809 B2 | * | 6/2003 | Stach et al. | 382/100 |

* cited by examiner

Primary Examiner—Kanjibhai Patel
Assistant Examiner—Abolfazl Tabatabai

(57) ABSTRACT

The present invention relates to the methods of estimation and recovering of general affine geometrical transformations which were applied to data, extensible to any other defined class of geometrical transformations, according to the preamble of the dependent claims. The parameters of the undergone deformation are robustly estimated based on maxima given by a parametric transform such as Hough transform or Radon transform of some embedded information with periodical or any other known regular structure. The main applications of this invention are robust digital still image/video watermarking, document authentication, and detection of periodical or hidden patterns. In the case of periodical watermarks, the watermark can also be predistorted before embedding based on a key to defeat block-by-block removal attack.

10 Claims, 5 Drawing Sheets

FIG. 2A. Reference grid structure.   FIG. 2B. Affine-transformed grid.

FIG. 3A. Noisy extracted points $P$ after affine transform (e.g.: a rotation).

FIG. 3B. Fitted lines to the grid of points (here the 2 main directions, plus the 2 diagonals are represented).

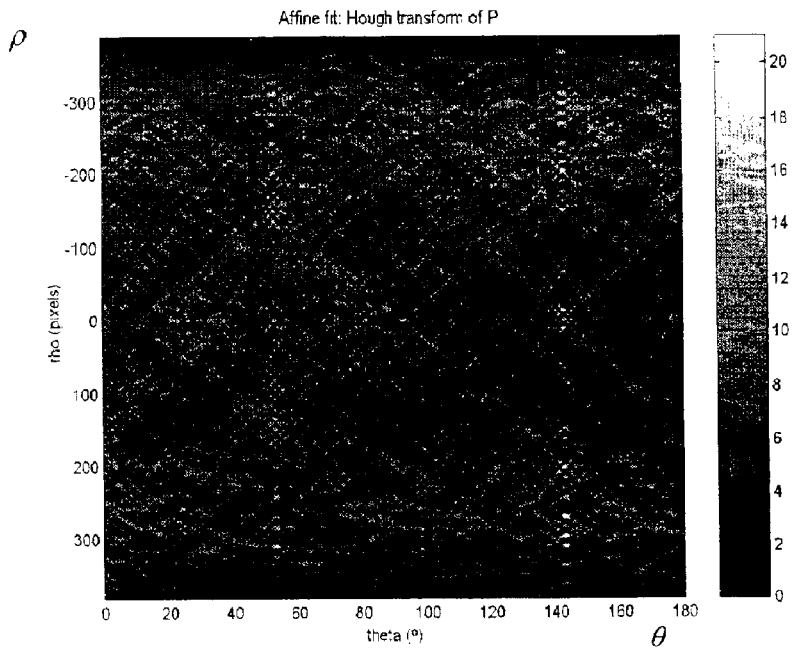

FIG. 4A. Hough transform $H$ computed from $P$, resulting from the ACF or MS of the input data; the horizontal axis ($\theta$) is the angle of projection, the vertical axis is the distance of projection ($\rho$), and the gray-level scale on the right stands for the number of projected points.

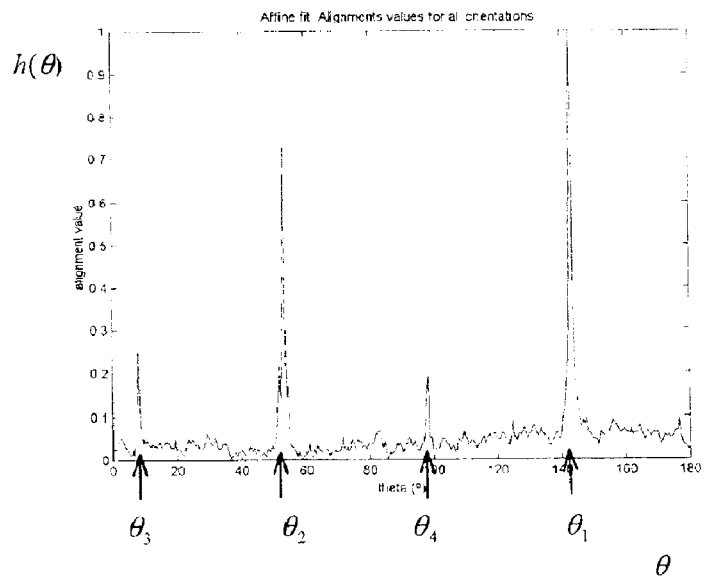

FIG. 4B. Estimation of the main angles of projection, the curve beeing any alignment contribution function $h(\theta)$ of the angle of projection; peaks correspond to alignements angles: $\theta_1$ and $\theta_2$ are the main axes angles, and $\theta_3$, $\theta_4$ 2 diagonals.

FIG. 4

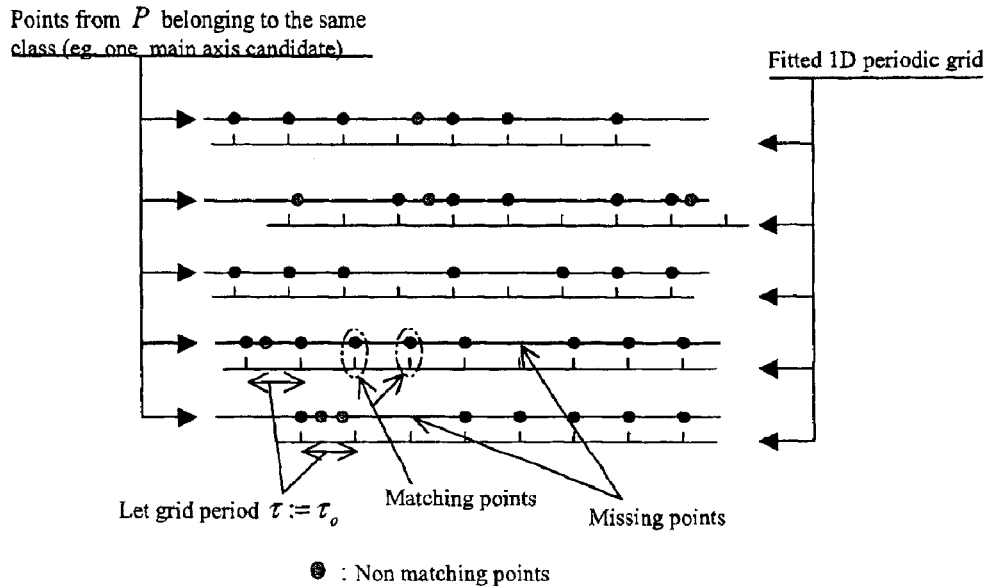

FIG. 5A. Idea of a matching function $M(\tau)$ of a period $\tau$, given a noisy set of extracted points belonging to the same main axis (therefore on parallel alignments); the figure shows the case of $M(\tau_0)$, where $\tau_0$ is the correct period: the idea is to count points which match with the fitted 1D grid.

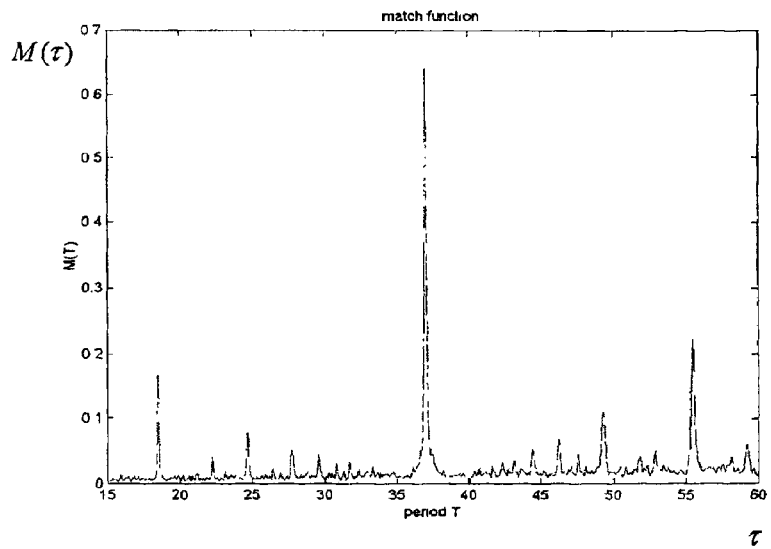

FIG. 5B. Plot sample of such a matching function, $M(\tau)$ showing the largest peak when $\tau = \tau_o$ ; here $\tau_o = 36$.

FIG. 5

METHOD FOR THE ESTIMATION AND RECOVERING OF GENERAL AFFINE TRANSFORM

CROSS-REFERENCE TO RELATED APPLICATIONS

In some embodiment this application refers to an extension of the described method to the recovering of local non-linear distortions in the U.S. Patent Application No. 60/327,097 filled by Sviatoslav Voloshynovskiy, Frédéric Deguillaume and Thierry Pun in Oct. 4, 2001 and entitled "Method for Digital Watermarking Robust Against Local and Global Geometrical Distortions and Projective Transforms" [1].

BACKGROUND OF THE INVENTION

The present invention describes a method of estimation and recovering of general affine geometrical transformations, and is extensible to any other defined class of geometrical transforms. The main applications of the invention are robust digital still image/video watermarking, document authentication, and detection of periodical or hidden patterns; In the case of periodical watermarks, the watermark can also be predistorted before embedding based on a key to defeat block-by-block removal attack. These applications of the invention are based on common methodology that assumes the existence of a periodical or known regular structure (both visible or perceptual unperceived) in the body of the visual document. Following the estimation of these structures, a determination of the undergone image transformations can be performed based on this estimation.

In watermarking applications the perceptually invisible periodical pattern of possibly encrypted and encoded data is embedded in the structure of the visual document for copyright protection, document authentication or tamperproofing. In the other applications the invisible pattern contains the necessary information about user/owner, index, ID number, relative coordinates and so on. The invisible pattern is further used for the detection of undergone geometrical transformations, for document indexing, or generally for recognition using estimated parameters of the embedded patterns. Therefore, the main challenging practical problem consists in the robust detection and estimation of the parameters of the hidden patterns, that is the subject of the proposed approach.

The state-of-art methods capable to estimate and recover undergone geometrical transformations can be divided into several groups depending on the reference structure used and on the method applied to estimate the parameters of the affine or other class of geometrical transform. We will mostly concentrate our review on the still image watermarking application of the proposed approach. Obviously, the approach is easily applicable to the rest of the above mentioned tasks with minimal modifications in the basic method structure.

Digital image watermarking has emerged as an important tool for author copyright protection and document authentication. A number of methods (see [2] for a detailed review) were proposed since the first publications on this subject in 1994. In e.g. [3] important issues of watermarking system robustness were pointed out. One of the most important question in the practical application of digital image watermarking is robustness against geometrical attacks such as rotation, scaling, cropping, translation, change of aspect ratio and shearing. All these attacks can be uniquely described using the apparatus of affine transformations [4,5].

An affine transformation can be represented by the 4 coefficients a,b,c,d composing the matrix A for the linear part, plus the coefficients $v_x, v_y$ of the translation vector $\vec{v}$:

$$A = \begin{pmatrix} a & b \\ c & d \end{pmatrix}, \quad \vec{v} = \begin{pmatrix} v_x \\ v_y \end{pmatrix} \tag{G1}$$

Therefore, an affine transformation maps each point of cartesian coordinates $(x, y)^T$ to $(x', y')^T$, according to the formula:

$$\begin{pmatrix} x' \\ y' \end{pmatrix} = A \cdot \begin{pmatrix} x \\ y \end{pmatrix} + \vec{v} \tag{G2}$$

where "." is the matrix product, and "+" the vector sum. However, since translations can be easily and independently determined, for example based on cross-correlation with some embedded reference information, in the following we will only consider the linear part A.

The successive combination of n affine transforms $A_i$, $i=1 \ldots n$ yields another affine transform, and can be expressed as:

$$A = A_n \cdot A_{n-1} \cdot \ldots \cdot A_1 \tag{G3}$$

(ignoring the translation components). Below are given examples of simple affine transforms:

a rescaling of factor s is represented by:

$$S = \begin{pmatrix} s & 0 \\ 0 & s \end{pmatrix} \tag{G4}$$

a change of aspect-ratio of factors $s_x, s_y$, which is equivalent to different rescalings along the x- and the y-axis, is:

$$S' = \begin{pmatrix} s_x & 0 \\ 0 & s_y \end{pmatrix} \tag{G5}$$

a rotation of angle $\theta$ is:

$$R = \begin{pmatrix} \cos\theta & \sin\theta \\ -\sin\theta & \cos\theta \end{pmatrix} \tag{G6}$$

a shearing along the x- and the y-axis of factors $s'_x, s'_y$ is:

$$S_h = \begin{pmatrix} 1 & s'_x \\ s'_y & 1 \end{pmatrix} \tag{G7}$$

horizontal and vertical flipping are also affine transforms, respectively given by:

$$F_H = \begin{pmatrix} -1 & 0 \\ 0 & 1 \end{pmatrix}, \quad F_V = \begin{pmatrix} 1 & 0 \\ 0 & -1 \end{pmatrix} \tag{G8}$$

Depending on the reference features used the existing methods for recovering from affine transformations can be divided into 3 main groups: methods using a transform invariant domain [4], methods based on an additional template [5], methods exploiting the self-reference principle based on an auto-correlation function (ACF) [6,7] or magnitude spectrum (MS) of the periodical watermarks [8].

The transform invariant domain approach entirely alleviates the need for estimating the affine transformation. It consists in the application of the Fourier-Mellin transform to the magnitude cover image spectrum. Watermarking in the invariant domain consists in the modulation of the invariant coefficients using some specific kind of modulation. The inverse mapping is computed in the opposite order. However, the above approach is mathematically very elegant but it suffers from several drawbacks. First, the logarithmic sampling of the log-polar map must be adequately handled to overcome interpolation errors and provide sufficient accuracy. Therefore, the image size should be sufficiently large, typically not less than a minimum of about 500×500 pixels. Additionally, this approach is unable to recover changes of the aspect ratio; to handle such aspect ratio change, a log-log mapping can be used. It is however impossible to simultaneously recover from rotation and rescaling (accomplished by the log-polar mapping) and from an aspect ratio change (which requires a log-log mapping).

To overcome the problem of poor image quality due to the direct and inverse Fourier-Mellin transform and associated interpolation errors, the template approach might be used. The template itself does not contain any payload information and is only used to recover from geometrical transformations. Early methods have applied a log-polar or a log-log transformation to the template [5,9]. However, the above mentioned problem of simultaneously recovering from rotation and change of aspect ratio still exists.

A recent proposal [10] aims at overcoming the above problem using the general affine transform paradigm. However, the necessity to spend the bounded watermark energy for an extra template, and the threat that attackers would remove template peaks, led to the use of a self-reference method based on the ACF [6,7] which utilizes the same affine paradigm. A similar approach based on the ACF for the identification of the geometrical transforms in non-watermarking applications was proposed in [11]. In [7] the watermark is replicated in the image in order to create 4 repetitions of the same watermark. This enables to have 9 peaks in the ACF that are used to estimate the undergone geometrical transformations. The descending character of the amplitude of the ACF peaks (shaped by a triangular envelope) reduces the robustness of this approach to geometrical attacks accompanied by a lossy compression. The need for computing two discrete Fourier transforms (DFT) of double image size to estimate the ACF also creates some problems for real time application in the case of large images.

The above considerations show the need for being able to estimate the undergone affine transformations. The algorithms for performing this estimation can be divided into 2 categories:

algorithms based on log-polar and log-log mapping [4,5];
algorithms performing some constrained exhaustive search aiming at the best fitting of a reference pattern with the analyzed one [7,10].

These approaches have several drawbacks from the robustness, uniqueness and computational complexity points of view. Methods in the first category are able to estimate rotation and scaling based on log-polar map (LPM). The log-log map (LLM) enables estimation of changes in aspect ratio [5,12]. However, estimation of several simultaneous transformations or general affine transforms cannot be accomplished. Moreover, these methods are quite sensitive to the accuracy of the mapping and distortions introduced by lossy JPEG compression. In the second category, the approach proposed by Shelby Pereira and Thierry Pun is potentially able to recover from general affine transformations. However, it is based on a constrained exhaustive search procedure and when the number of reference points increase the computational complexity could be also quite high in order to verify all combinations of the sets of the matched points. Also, results reported in [13] show that the efficiency is not very high against scaling when using the Fourier magnitude template as a reference watermark. Moreover, false points in the magnitude spectrum, due to lossy compression or any other distortion, can cause artifacts in the detected local peaks that will considerably complicate the search procedure, and therefore resulting in a lower robustness of the watermarking algorithm in general. It is necessary to mention that the a priori information about the specific regular geometry of the template points was not used in this approach. The template consists of a random set of points located in the spatial mid-frequency band of the images.

To overcome the above mentioned difficulties we propose to utilize the information about the regular structure of the template, or the ACF or the MS of the periodically repeated watermark [8]. This enables to consider a template with a periodical structure, or the spectrum of the periodically repeated watermark as a regular grid or as a set of lines with a given period and orientation. Therefore, keeping in mind this discrete approximation of the grid of lines one can exploit a Hough transform (HT) [14] or a Radon transform (RT) [15] in order to obtain a robust estimate of the general affine transform matrix.

This approach has a number of advantages in comparison with the previous methods. First, it is very general, which makes it possible to estimate and recover from any affine transformation or combination of sequentially applied affine transformations. Moreover, the false peaks or outliers on the grid due to lossy compression or possibly to other attacks do not decrease the robustness of the approach due to the redundancy of the peaks. Therefore, the proposed approach is tolerant even to very strong lossy compression, which is not the case for the known methods. Finally, the strict mathematical apparatus of the HT or RT alleviates the need for an exhaustive search.

Martin Kutter and Chris Honsinger [7,11] proposed to use the ACF to find the possible geometrical modifications applied to the image. The reported results rely on 2 or 4 repetitions of the same mark. It should be noted that this approach can generate 3 or 9 peaks respectively in the ACF. Therefore, with such a small number of peaks any compression or other signal degradation artifact can cause an ambiguity in the estimation of the affine transform parameters. Oppositely, the MS approach proposed earlier by us can result in a higher robustness due to the high redundancy even in the above case; if the watermark has been embedded many times, one can also use the ACF to get an accurate approximation of the underlying regular structure.

Finally we want to mention that we further proposed an extension of our approach aiming at resistance to non-linear or local random distortions introduced by the random bending attack (RBA) [1,16]. In that situation, the RBA can be also expressed in term of a number of local affine transforms. Therefore the determination of the undergone transformation at the global level could be combined with the recovering from RBA at the local level.

From the above review we can conclude that the existing technologies exhibit at least one of the following problems:
1. Inability to recover from general affine transformations.
2. High computational complexity of the exhaustive search in the case of many reference points.

3. Low robustness against geometrical transformations accompanied by the lossy JPEG or wavelet compression.
4. Inability to recover from the combination of several affine transforms.
5. Lack of protection against intentional template removal, this especially when the number of reference points is comparatively small (less than a hundred).

SUMMARY OF THE INVENTION

It is the object of the present invention to provide a method of the type mentioned above that is capable of dealing with at least some, preferably all of these problems. According to the present invention, the problem is solved by the method of the dependent claims. Preferred embodiments are described in the dependent claims. The present method is suited for the robust watermarking of still images and video and can be also applied to the above mentioned applications.

The invention resides in a method for the robust determination of the affine transform applied to an image, using as input data maxima peaks extracted from the autocorrelation function (ACF) or from the magnitude spectrum (MS) of a periodical signal which was embedded into the image, and predicted from the possibly distorted image. Due to side-lobes in the ACF or various noise in the MS domain, one or several of the following situations can occur:

some of the peaks are missed;

some of the peaks are considerably decreased in level;

even if 3 peaks are enough in theory to estimate affine parameters, there would be a lack in precision and considerable ambiguity, and further many false peaks complicate the detection of the right peaks;

there is no obvious structure or feature that makes it possible to differentiate between correct peaks and false peaks;

if an exhaustive search would be applied to find the correct parameters of the applied affine transform, the high redundancy of the structured set of peaks would not be exploited.

Therefore we propose to increase the robustness and the precision by creating a distinguishing feature for the correct peaks, or points. For this purpose we use the a priory knowledge of the regularity and periodicity of the underlying structure or underlying grid, to robustly detect significant alignments while ignoring random outlier points, instead of using an exhaustive search. Typically we expect that points are aligned along 2 main directions, or main axes, and that they are equally spaced along each main axis, with one period for each main axis. For this purpose we use either the Hough transform (HT) [14] of extracted points, or the Radon transform (RT) [15] of the ACF or MS domain, in order to emphasize alignments, and consequently find the main axes (FIG. 1, diagram block 1). The method can be generalized as follows:

in place of the ACF or MS any suitable representation (or even a template with some regularity) can be used which results in points reflecting the periodicity or the regularity of the synchronization data;

the synchronization data or template can be embedded either in the spatial domain or in any transform domain of the image or data we want to synchronize, including—but not restricted to—Discrete Fourier transform (DFT), Discrete Cosine transform (DCT), discrete Wavelet transform (DWT), as well as into any number of frames along the time axis in video applications;

any robust parametric transform can be used in place of HT or RT, reflecting at least some of the features we want to robustly estimate, like the main axes;

the underlying grid can be any a priory known function of the coordinates, with the parameters uniquely depending on the geometrical distortion we want to estimate; in this case the generalized HT or generalized RT, or any generalized robust parametric transform could be used;

points positions can be slightly and randomly displaced relatively to their underlying grid, for example in the case of slight random local distortions or random bending attack (RBA), without loss in robustness while estimating the globally applied distortion;

moreover, the approach stands also for any geometrical distortion, not only affine or linear, which can be described with a relatively small number of parameters, or that can be parameterized.

Preferred embodiments are: embedding synchronization data or a template with some regularity, or the periodical data, either in the spatial domain or in any transform domain like DFT, DCT, DWT, or video time axis; extracting a representation of the synchronization data such as maxima peaks, using a transformation like ACF or MS, or any template with the required regularity, either in the spatial domain or in the transformed domain; converting the obtained structure to HT, RT, or any robust parametric representation, possibly generalized to any a priory known function of coordinates; the possibility to extend the method to other kind of geometrical transform, not only affine, as well as the robustness in estimating global parameters in the case of RBA, which introduces slight local displacements but does not introduce significant distortion at the global level; and the possibility to introduce key-dependant predistortions before embedding to defeat attacks based on averaging.

The invention further resides in robustly finding the alignments, curves, or any desired parameters, based on the robust parametric transform, and in possibly refining the result using the original input points for better precision. Generally, peaks in the parametric representation are projected on the axis corresponding to the parameter which has to be estimated; in HT or RT, each peak corresponds to an alignment of points, and projecting these peaks to the angle axis allows the detection of the angles of the 2 main axes (2) of the underlying grid—each of them corresponding to a distinct group of parallel alignments (FIG. 4A). While aligned points give the highest contributions in the parametric transform, random noisy points are expected to give no significant contribution. In the case of generalized HT, RT or parametric transform, and of a general underlying grid function, each main axis corresponds to one class of curves or one class of points.

Preferred embodiments are: detecting the contribution of the main axes in the parametric transform, based on any criteria, corresponding to classes of parallel lines, or of to any other class of points or curves; identifying the wanted parameters corresponding to each contribution, which are angles of the main axes in the case of affine transform, or any other characteristic features.

The invention further resides in possibly refining the estimated parameters by directly using the input points, since the computation of the robust parametric transform can show a lack in precision due to interpolation errors. Therefore a record of which points have been projected into each class in the parametric transform is kept, in order to fit curves, a grid, or parameters directly to these points, for each class of points. Any robust fitting method can be used. In the case of HT or RT, lines are fitted to points belonging to each alignment, helping us in precisely estimating the main axes. To increase the accuracy of the parameter estimation, any point manipulation, such as outliers removal or redundancy reduction, can further be used.

Preferred embodiments are: possibly keeping track of which points have been projected in the robust parametric transform; fitting lines, curves, grid, or parameters directly to these points for each identified class, using any lines, curves, grid, or parameters robust fitting approach; the fact that such fit directly done with the original points can increase the precision of the parameters estimation; the use of any point manipulation in order to enhance the accuracy and the precision of the parameters estimation.

The invention further resides in estimating the remaining parameters, if needed, which were not estimated in the previous steps. Such parameters can be estimated either from the robust parametric transform representation, or estimated and/or refined directly based on the input points for each identified class. In the case of HT or RT, the most probable period repetition of points along each main axis should be estimated (5); any robust estimation method such as distances histogram, matching function of a given period with points, correlation, another robust parametric transform, etc. can be used for this purpose. Any point manipulation, such as outliers removal or redundancy reduction, can further be used to increase the accuracy and the precision of the estimation.

Preferred embodiments are: estimating the remaining parameters if needed, either from the parametric transform, and/or directly from the points belonging to each identified class—e.g. each main axis; and the optional use of any point manipulation for better accuracy.

The invention further resides in computing the global geometric transform from the estimated parameters, by comparison with the parameters corresponding to the originally embedded data. In the case of an affine transformation estimated based on HT or RT, four parameters are needed. The HT or RT allows the estimation of 2 main axes, within one repetition period for each of them—therefore 2 main axes and 2 periods, resulting in the 4 parameters a,b,c,d needed for the affine matrix A. Depending on which transform has been used, the estimated parameters should be converted to the spatial domain—e.g. taking the inverse of the estimated periods in the case of the MS or Fourier transform to get spatial distances. Also, any ambiguities generated, in the case of affine transformations, by vertical and/or horizontal flips and/or 90°-rotations, could be solved based on any method, e.g. by some reference information inserted into the embedded pattern, or by the symmetry of the pattern. Finally the robustness of the approach can be increased by estimating, during the steps above, more occurrences of parameters than strictly needed, for example more than 2 main axes candidates and more than 2 periods candidates in the case of affine transforms; any method can be used to select the correct transform from these candidates, such as additional embedded reference information.

Preferred embodiments are: computing the global geometric distortion by comparing the estimated parameters with the original expected ones; converting the estimated parameters to the spatial domain if needed; solving flip and/or 90°-rotations ambiguities, in the case of affine transforms, by any method; and finally estimating several feature candidates and selecting the correct geometrical transform using any method.

2A. Grid and vectors $\vec{u}_o, \vec{v}_o$ corresponding to the main axes and periods of the originally embedded information, and which are used as a reference in the algorithm.

2B. Distorted grid and corresponding vectors $\vec{u}, \vec{v}$ after the application of an affine distortion.

Figure 3:
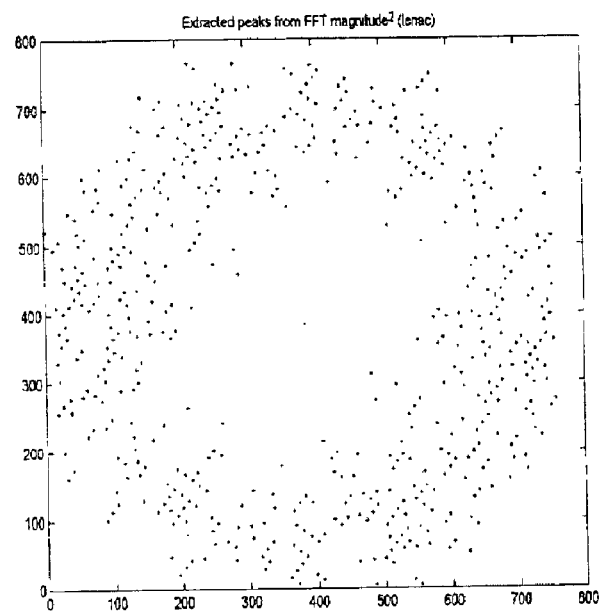
Figure 3:
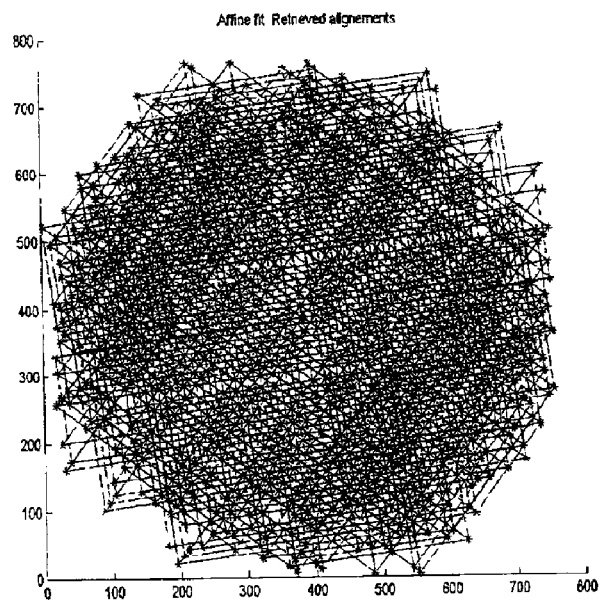

FIG. 3: Extracted points or regular template P in the case of periodic synchronization data or template, and line fitting in order to estimate the corresponding grid parameters.

3A. Noisy input points P, as they have been extracted from peaks in ACF or the MS domain, after affine transform.

3B. Fitted lines to theses points, corresponding to the main axes $ê_i$, i=1 ... $N_{axes}$ of the underlying grid. Here $N_{axes}$=4 orientations have been fitted: 2 for the main axes, and 2 for the diagonals.

FIG. 4: Shows the HT or RT parametric representation H, and how the projection angles $\theta_i$, i=1 ... $N_{axes}$ corresponding to the main axes are computed based on any contribution function $h(\theta)$. Such contribution function can be a cumulative function of the HT or RT values vertically onto the angle axis, in order to get maxima for the correct angles: the vertically aligned peaks from the HT or RT, corresponding to parallel alignments, result in maxima of $h(\theta)$.

4A. HT or RT domain H, with projection angles $\theta$ represented horizontally from 0 to 180°, and projection distances $\rho$ represented vertically from −300 to 300 pixels in this example.

4B. Contribution $h(\theta)$ of alignments as a function of the projection angle, exhibiting here 2 large peaks for the 2 mains axes (angles $\theta_1$ and $\theta_2$), and 2 smaller for the 2 diagonals ($\theta_3$ and $\theta_4$).

FIG. 5: Concerns the estimation of the most probable period of points along each main axes in the case of periodical synchronization data or template, from points belonging to each class, or from the intervals between peaks in the parametric transform H.

5A. Representation of the computation of a matching function $M(\tau)$ with a noisy extracted class of points, with $\tau=\tau_o$ in this example, $\tau_o$ being the correct period.

5B. Plot example of $M(\tau)$, showing the largest peak for $\tau=\tau_o$.

In the drawings identical parts are designated by identical reference numerals.

DETAILED DESCRIPTION OF THE INVENTION

We formulate the method as recovering of the general affine transformation, or other global geometrical distortion, applied to an image, using regular grids of points for the estimation of affine matrix coefficients, based on the Hough transform (HT), the Radon transform (RT), or any other parametric transform. The entire approach is based on a regular grid of points, extracted from an input and possibly distorted image, and compared with a known reference grid, as explained below. If it is a color image, in RGB or any other color representation, then points can be extracted, and the described method applied, either from the luminance component, or from each color-plane separately, or any combination of these color-planes. The synchronization information can be embedded either in the spatial domain, or in any transform domain such as discrete Fourier transform (DFT), discrete cosine transform (DCT) or discrete wavelet transform (DWT), or in the succession of frames along the time axis in the case of video applications.

Figure 2:
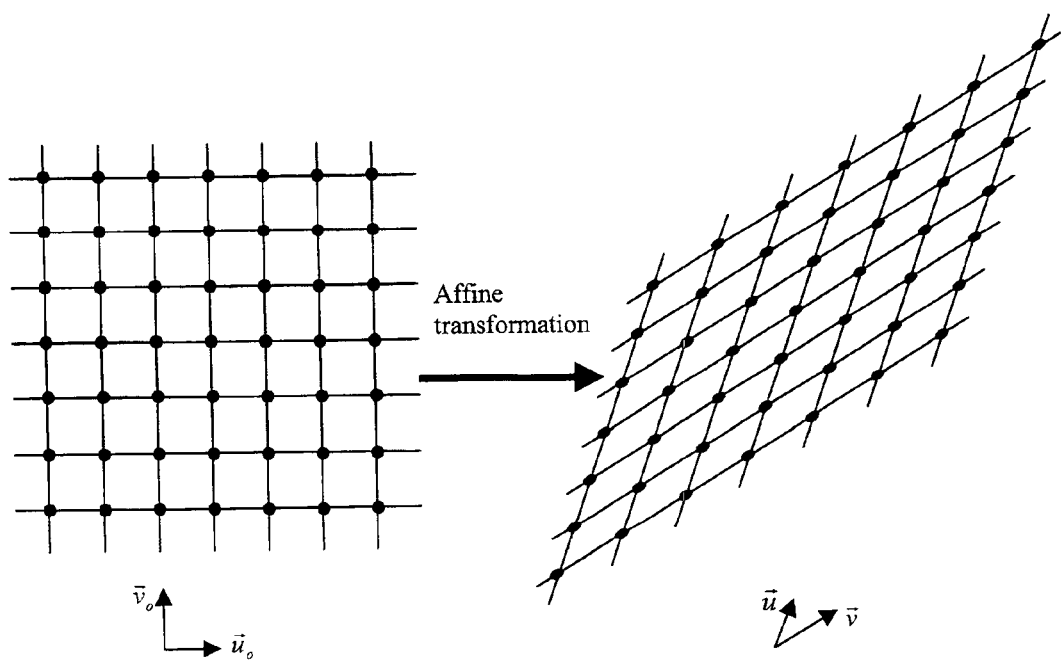
FIG. 2: In the case of affine distortions recovery with the use of HT or RT, expected underlying grid structure of input points, before and after the application of an affine transform. Points are placed at the intersection between lines. Such a grid can be represented by two vectors whose directions correspond to the directions of the two main axes, and whose norms are the periods of aligned points.

The first important point to mention is that the approach described here is not suitable for completely random or pseudo-random templates, since our method relies on an a priory known regularity for the extraction of the wanted features. In the case of periodical synchronization data or template undergoing an affine transformation, points are expected to be placed at intersections between two classes of equidistant spaced parallel lines as shown in FIG. 2. Theses two classes of lines should present distinct directions, distances between lines should be non-null and equal inside each class (therefore points are equally spaced along lines), but distances between points may differ from one class to the other. Our method is typically applicable to local maxima, or peaks, resulting from the auto-correlation function (ACF) or the magnitude spectrum (MS) generated by periodic patterns, and which keeps this regularity under any affine transformation; for this purpose a periodic pattern w should first be embedded to the original image. The ACF approach consists in computing the auto-correlation $\hat{w}*\hat{w}$ of the periodical pattern $\hat{w}$ which has been estimated from the possibly distorted image, where "*" is the convolution operator. The ACF can be computed as $\hat{w}*\hat{w}=F^{-1}(F(\hat{w})^2)$, where F is the DFT, $(\ldots)^2$ the complex square, and $F^{-1}$ the inverse DFT (IDFT). Peaks can also be extracted from the MS without computing the ACF (thus avoiding the IDFT computation), i.e. from the magnitude of the Fourier transform, expressed as $M=|F(\hat{w})|$ where $|\ldots|$ denotes the magnitude.

The second important point concerns the robustness of the proposed approach with respect to one or more distortions, including affine transformation combined with lossy compression like JPEG or any signal degradation or alteration. As mentioned in the previous section, the estimated input points are generally noisy, with missing points, additional false points, and errors in positions of the remaining correct points such as rounding errors. Therefore using directly these points would lead to a wrong estimation of the applied geometrical distortion. Using the a priory knowledge of the expected regularity or any special shape of the underlying grid, we can increase the contribution of correct points with respect to that regularity, while wrong points will tend to cancel their contribution due to their randomness properties. In the case a periodical grid, random points are less likely to present significant alignments than correct ones, and therefore the HT or RT can be used to robustly detect such alignments.

As already mentioned, the method is extensible to any kind of regular grid, including not only straight lines, but curves, by using generalized HT or RT; for other kinds of geometrical transformations, any parametric transform which gives a robust estimate of the desired parameters could be used; and the input points can be extracted from any suitable representation of a regular synchronization pattern like ACF or MS peaks, or any regular template.

Estimation of the Applied Affine Transform

Figure 1:
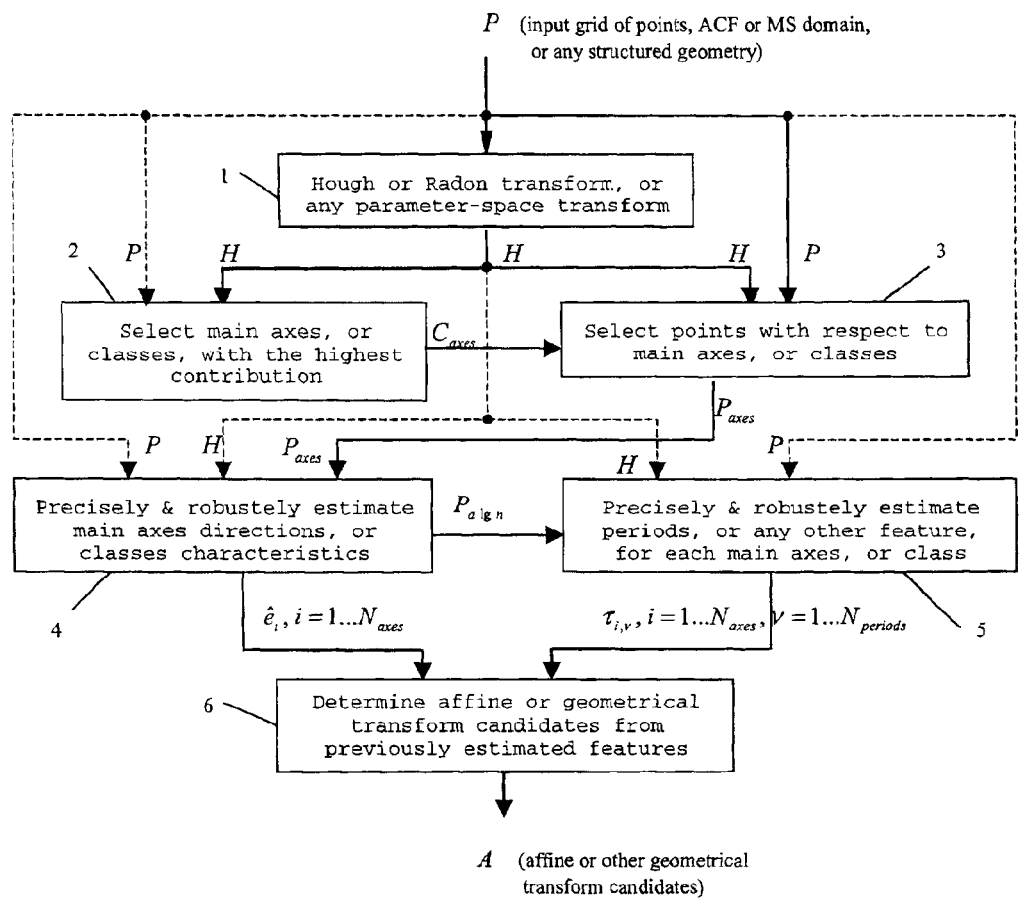
FIG. 1: An embodiment for the proposed algorithm is shown in this block-diagram: HT, RT, or any robust parametric representation (and possibly generalized) H from input points or ACF or MS domain P (block 1); extraction of the main axes corresponding to alignments, or any parameter values or equivalence classes we want to robustly estimate $C_{axes}$ (2); extraction of corresponding alignments and thus of $N_{axes}$ main axes of points $P_{axes}$, or classes based on any other criteria (3); line, curve, or whatever robust feature fitting to each class of points, resulting in a precise estimate of main axes $ê_i$, i=1 ... $N_{axes}$, and in sets of points regrouped by main axes $P_{a\ lg\ n}$, or any class related features (4); estimation of the periods of points in alignments $\tau_{i,v}$, i=1 ... $N_{axes}$, v=1 ... $N_{periods}$, or of any parameter which was not estimated during the previous steps (5); blocks (2–5) generally make use of features produced by the previous blocks (1–4) like $C_{axes}$, $P_{axes}$, and $P_{a\ lg\ n}$, and optionally directly the input domain or points P and/or the parameterized domain H; finally computation of the applied affine transform A, or of any global geometrical transform, comparing the estimated parameters such as $ê_i$ and $\tau_{i,v}$ with the theoretical parameters of the originally embedded synchronization data (6).

In the case of affine transformations, we can represent the 2 main axes, and periods, of the periodic reference grid by two vectors $\vec{u}_o$ and $\vec{v}_o$, and of which norms $\|\vec{u}_o\|, \|\vec{v}_o\|$ are the respective periods between points along each direction (FIG. 2A). Within the ACF or MS domain, an affine transform maps the reference grid to another one represented by vectors $\vec{u}$ and $\vec{v}$. The four parameters a,b,c,d have to be estimated, corresponding to the affine transform matrix A of Equation G1 (FIG. 1, block 6). Assuming that we know the reference grid, specified by $\vec{u}_o, \vec{v}_o$, and that we got the correct estimations of $\vec{u}$ and $\vec{v}$ from the extracted points, the matrix can be expressed as:

$$A = T \cdot T_o^{-1} \qquad (G9)$$

where the $(\ldots)^{-1}$ denotes the matrix inversion, with:

$$T = \begin{pmatrix} x_u & x_v \\ y_u & y_v \end{pmatrix}, \quad T_0 = \begin{pmatrix} x_{uo} & x_{vo} \\ y_{uo} & y_{vo} \end{pmatrix},$$

and with:

$$\vec{u} = \begin{pmatrix} x_u \\ y_u \end{pmatrix}, \quad \vec{v} = \begin{pmatrix} x_v \\ y_v \end{pmatrix}, \quad \vec{u}_o = \begin{pmatrix} x_{uo} \\ y_{uo} \end{pmatrix}, \quad \vec{v}_o = \begin{pmatrix} x_{vo} \\ y_{vo} \end{pmatrix}.$$

The directions and norms of the two vectors $\vec{u}_o, \vec{v}_o$ (represented by $T_o$) correspond to the periodicity along the two main axes of the embedded pattern w over the 2-dimensional image. The above corresponds to the general case. In practice however we typically embed a square pattern, which is repeated horizontally and vertically along the x- and y-axes with the same period $\tau$, and in this case $T_0$ becomes:

$$T_0 = \begin{pmatrix} \tau & 0 \\ 0 & \tau \end{pmatrix} \qquad (G10)$$

Depending on the transform used to extract points, further corrections in $\vec{u}$ and $\vec{v}$ may have to be applied in order to reflect the main axes orientations and period values in the spatial domain of the input data. Let say that $\vec{u}', \vec{v}'$ are the vectors coming from the estimated synchronization information: if the ACF was used, then we just take $\vec{u} = \vec{u}'$ and $\vec{v} = \vec{v}'$; but if the MS domain is used, one should calculate:

$$\vec{u} = \frac{N}{\|\vec{u}'\|} \cdot \hat{e}_u \quad \text{and} \quad \vec{v} = \frac{N}{\|\vec{v}'\|} \cdot \hat{e}_v \tag{G11}$$

where $$\hat{e}_u = \frac{\vec{u}'}{\|\vec{u}'\|}, \quad \hat{e}_v = \frac{\vec{v}'}{\|\vec{v}'\|}$$

are the unitary vectors along each main axis, using a N×N (square) domain size for the the DFT in order to preserve angles.

A last point to mention is the possibility of ambiguities in the estimate of the affine transformation. The extracted grid of points contains no information on the orientation of the vectors. Therefore the estimated vectors $\vec{u}$ and $\vec{v}$ may have wrong orientations, resulting in 8 ambiguities made of horizontal, vertical flips, and/or 90°-rotations. Then all of them may need to be checked. One mean to overcome this is to use patterns with central symmetry, presenting in this case only 2 ambiguities for 90°-rotations.

Hough Transform (HT) or Radon Transform (RT)

The computation of the ACF or MS shows peaks, corresponding to local maxima, reflecting the repetitive nature of the synchronization data. In order to estimate the affine transform, one can either extract the peaks positions, using any method and resulting in a discrete set of points, or simply take the ACF or MS domain as an input P for the following parametric transform: it will be the HT in case of extracted points, or the RT if the values from the transformed domain have been taken too, or any other parametric transform (FIG. 1, block 1). FIG. 3A shows this set of peaks, which is noisy due to some signal degradation, and after the application of an affine transform (here, a rotation). After extracting main axes and periods, it will then be possible to fit parallel lines to each alignment of points, thus resulting in 2 main axes and 2 periods. FIG. 3B shows such fitted lines, along 2 main axes, and along diagonals too since any diagonal also corresponds to alignments. Taking into account all points from P for the fitting ensures at the same time better precision and higher robustness.

We can then compute the parametric transform H from P (FIG. 1, block 1). HT or RT converts the x,y-representation a θ,ρ-representation, giving a projection distance from the origin in function of an angle of projection. After that a function of one of the parametric transform variable helps us in extracting the wanted features. FIG. 4A shows the HT of points from FIG. 3A, the projection ρ-axis being vertical and the angle θ-axis being horizontal; strong vertically aligned peaks are clearly visible in H, corresponding to the main axes angles. By vertically adding the contributions of peaks in H, we can obtain a function h(θ) as shown in FIG. 4B, showing the largest peaks at the angles which correspond to the main axes (FIG. 1, block 2). Note also that the diagonals can yield an ambiguity, since they obviously present alignments too; a solution to this problem can be offered by the h(θ) function, by taking into account the number of peaks added from the HT or the RT, thus exploiting the fact that diagonal orientations contain usually less parallel lines than correct ones: diagonal angles then result in much lower peaks in h(θ) as shown in FIG. 4B (angles $θ_3$ and $θ_4$).

Selection of Alignments of Points

The interest of a parametric representation is to allow the robust estimation of the correct parameters corresponding to the applied geometrical transform, which could be estimated from H directly. In our example, the angles of maximum contribution correspond to the orientations of the main axes. However this could lead to a lack in precision due to interpolation errors while computing the parametric transform H. It is therefore also possible to directly use points from P in order to refine the precision of the wanted features which have been estimated from the parametric transform H. In this case H gives us the information we need in order to select the correct points in P, and a precise estimate of parameters is directly computed from these points. For affine transforms, the HT or RT helps us in selecting points aligned along the correct main axes (FIG. 1, block 3).

Estimation of Main Axes Orientations

Once the correctly aligned points have been selected in P, any procedure for robust fitting of lines, curves, or any other feature can be used. In our example lines are fitted to the selected alignments corresponding to the 2 distinguished main axes; least square, least median square, linear regression, or any robust line fitting algorithm can be used for this purpose (FIG. 1, block 4). Any feature can be robustly fitted to the correct points of P, based on the distinguishing information obtained from H. For affine transforms and HT or RT, since each main axis exhibits a group of parallel lines, the combination (average, median, etc.) of all orientations in a class of parallel lines gives the precise orientation of the corresponding main axis. Further, any manipulation of the set of points, which could increase the robustness and/or the precision of the estimation, can be used; such manipulation are—but are not restricted to: additional point estimation in intersections between the identified lines, estimation of additional lines where points are missing, etc.

Estimation of Periods

At this stage, it is possible that not all the needed parameters have been estimated. In the affine transforms, in the HT or RT example, only the main axes orientation have been estimated (giving the $\bar{u}$ and $\bar{v}$ directions only), thus intervals between points have to be estimated too (FIG. 1, block 5). In general, any robust approach can be used for the estimation of the remaining parameters, including—but not limited to—another parametric transform, as well as a direct estimation using the selected points from P, or the lines or curves which have been fitted in the previous steps. In the case of affine transform, we can select all aligned points belonging the each class of parallel lines, corresponding to each main axis. FIG. 5 illustrates the problem of estimating the best interval between points, even in the case of noise: points on correct lines have been selected, but wrong points may still be present on correct lines; several or all parallel alignments (thus belonging to the same class) can be used (FIG. 5A). A correlation-like approach, based on a matching function M(τ) of a candidate period τ with respect the alignments, can be used (FIG. 5B); we can see that M(τ) gives the highest peak when τ is equal to the correct period $τ_o=37$ in this example.

Estimation of the Right Distortion from Candidates

At this point the characteristics from the embedded and distorted grid of points have been estimated. The estimated parameters can be used in order to further estimate the applied global geometrical transform, by comparison with known parameter values corresponding to the originally embedded synchronization data (FIG. 1, block 6). The idea in the previous steps is to estimate more than the strictly needed number of parameter values, in order to generate more than one geometrical transform candidate. Therefore, additional reference information in the synchronization data, or any other mean, can help us in selecting the correct distortion—giving, if wanted, a trade-off between unique distortion estimation and fully exhaustive search, increasing the robustness of the method. For affine transformations, the matrix A can be estimated from the (distorted) vectors $\vec{u}, \vec{v}$ and (original) vectors $\vec{u}_0, \vec{v}_0$ as described in Equation G9, and possibly G10 or G11. In the previous steps, we can compute $N_{axes} \geq 2$ possible main axes (for a minimum required of 2), and $N_{periods} \geq 1$ possible periods (at least 1) per axis; consequently there will be a total of $N_{aff} = C_2^{N_{axes}} \times N^2_{periods}$ matrix candidates to check.

REFERENCES

1. Sviatoslav Voloshynovskiy, Frédéric Deguillaume and Thierry Pun, Method for Digital Watermarking Robust Against Local and Global Geometrical Distortions and Projective Transforms. U.S. Patent Application 60/327,097, filed in Oct. 4, 2001.
2. J. R. Hernandez and F. Perez-Gonzalez and J. M. Rodriguez and G. Nieto, Performance Analysis of a 2D-Multipulse Amplitude Modulation Scheme for Data Hiding and watermarking of Still Images, IEEE Journal on Selected Areas in Communications, vol. 4, No 16, pp. 510–523, May 1998.
3. S. Voloshynovskiy, S. Pereira, V. Iquise and T. Pun, Attack modelling: Towards a Second Generation Watermarking Benchmark, Signal Processing, 2001.
4. J. J. K. Oruanaidh, and T. Pun, Rotation, Scale and Translation Invariant Spread Spectrum Digital Image Watermarking, Signal Processing, v. 66, No 3, pp. 303–317, 1998.
5. S. Pereira, J. J. K. Oruanaidh, F. Deguillaume, G. Csurka and T. Pun, Template Based Recovery of Fourier-Based Watermarks Using Log-polar and Log-log Maps, in Int. Conference on Multimedia Computing and Systems June, 1999.
6. M. Kutter, Digital image watermarking: hiding information in images, PhD thesis, August 1999, EPFL, Lausanne, Switzerland.
7. M. Kutter, Watermarking resistent to translation, rotation and scaling, in Proc. SPIE Int. Symp. on voice, Video, and Data Communication, November 1998.
8. S. Voloshynovskiy, F. Deguillaume and T. Pun, Content Adaptive Watermarking based on a Stochastic Multiresolution Image Modeling, EUSIPCO 2000, Tampere, Finland, September 2000.
9. J. Oruanaidh, and S. Pereira, A Secure Robust Digital Image Watermark, Electronic Imaging: Processing, Printing and Publishing in Colour, May 1998.
10. S. Pereira, T. Pun, Fast Robust Template Matching for Affine Resistant Watermarks, Lecture Notes in Computer Science: Third International Workshop on Information Hiding, Springer, v. 1768,pp. 199–210, 1999.
11. Chris Honsinger, Scott Daly, Method for detecting rotation and magnification in images, patent U.S. Pat. No, 5,835,639, 1998.
12. F. Deguillaume, G. Csurka, J. J. K. Oruanaidh and T. Pun, Robust 3D DFT Video Watermarking, IS&T/SPIE Electronic Imaging 99, San Jose, Calif., USA, January 1999.
13. Shelby Pereira, Sviatoslav Voloshynovskiy and Thierry Pun, Effective channel coding for DCT watermarks, In IEEE International Conference on Image Processing ICIP 2000, Vancouver, Canada, Sep. 10–13 2000.
14. P. Hough, Method and means for recognizing complex patterns, U.S. Pat. No. 3,069,654, 1962.
15. S. R. Deans, Hough transform from Radon transform, IEEE Transactions on PAMI, vol. 3, no. 2, pp. 185–188, March 1981.
16. Sviatoslav Voloshynovskiy, Frederic Deguillaume, and Thierry Pun, Multibit Digital Watermarking Robust Against Local Nonlinear Geometrical Distortions, In IEEE International Conference on Image Processing, ICIP2001, pp. 999–1002, Thessaloniki, Greece, 2001.

We claim:

1. A method for the robust determination and recovering from general affine transformations, or any other defined parametric class of geometrical transformations, applied to data Y wherein said data contains a set of points or structured pattern supposed to follow an underlying regular grid, comprising the steps of:
    (a) detecting these points in some domain;
    (b) representing the detected points by their Cartesian coordinates and possibly keeping also their values;
    (c) calculating the parametric or the projective transform matched with the defined geometry of the points resulting in the corresponding maxima, for the specified geometry of points, and exploiting the redundancy in points, to extract the needed significant features from these maxima;
    (d) estimating the parameters of the possibly applied transformation from the class of affine transformations, or any other defined class, using information from (b) and (c);
    (e) recovering of the applied transformation using the parameters estimated in (d);
whereby said estimating of geometrical transformation assists in the recovering from global image alterations whereby said Y containing a hidden set of points can be visually undistinguishable from the original data X.

2. The method of claim 1 wherein said parametric or projective transform uses Hough transform (HT), Radon transform (RT), any generalized version of these transforms, or any other parametric or projective transform.

3. The method of claim 1 wherein said regular grid corresponds to significant local maxima or peaks of the auto-correlation function (ACF), or of the magnitude spectrum (MS) associated with an embedded periodic pattern, also possibly containing a multi-bit message, or any "appropriate function" of a "periodical watermark" or of a watermark with some regularity.

4. The method of claim 1 wherein said grid corresponds to any modified pattern of plurality of points of a geometrically structured pattern which in the matched parameter-space projection guarantees the existence of distinguishable maxima.

5. The method of claims 1, 3 or 4 wherein said grid or pattern possibly is perceptually invisible and embedded using any kind of perceptual masking.

6. The method of claim 1 wherein said set of points is key-based globally transformed before combining it with said data X whereby said Y can be visually undistinguishable from said X.

7. The method of claim 1 wherein said set of points is transformed to match image features in coordinates domain, or in any transformed domain.

8. The method of claim 1 wherein said parametric or projective transform is used to estimate the parameters of the applied global affine transformation using said robust estimation of rotational angle and robust estimation of said periods from the distorted set of points.

9. The method of claim 1 applied to video data, wherein a said structured or periodic pattern is used within any number of frames, in the plurality of frames along the time axis.

10. The method of claim 1 wherein said transform is applied to points in spatial domain, Discrete Cosine transform (DCT) domain, Discrete Fourier transform (DFT) domain, Discrete Wavelets transform (DWT) domain, or any suitable transform domain, or some combination thereof.

* * * * *